United States Patent
Goh et al.

(10) Patent No.: US 8,712,207 B2
(45) Date of Patent: Apr. 29, 2014

(54) DIGITAL PHOTOGRAPHING APPARATUS, METHOD OF CONTROLLING THE SAME, AND RECORDING MEDIUM FOR THE METHOD

(75) Inventors: Ji-hyun Goh, Seongnam-si (KR); Ung-sik Kim, Suwon-si (KR); Myung-kyu Choi, Suwon-si (KR); Hyun-ock Yim, Seoul (KR); Tae-hoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 13/018,656

(22) Filed: Feb. 1, 2011

(65) Prior Publication Data

US 2011/0193995 A1    Aug. 11, 2011

(30) Foreign Application Priority Data

Feb. 10, 2010  (KR) ................... 10-2010-0012402

(51) Int. Cl.
*H04N 5/76*      (2006.01)
*G06F 17/00*     (2006.01)

(52) U.S. Cl.
USPC ....................................................... 386/200

(58) Field of Classification Search
None
See application file for complete search history.

(56) References Cited

U.S. PATENT DOCUMENTS

| 2003/0016782 | A1* | 1/2003 | Kaufman et al. | 378/50 |
|---|---|---|---|---|
| 2004/0122539 | A1* | 6/2004 | Ainsworth | 700/94 |
| 2004/0160439 | A1* | 8/2004 | Xavier | 345/419 |
| 2005/0182503 | A1* | 8/2005 | Lin et al. | 700/94 |
| 2008/0004731 | A1* | 1/2008 | Ozaki | 700/94 |
| 2008/0040123 | A1* | 2/2008 | Shishido | 704/503 |
| 2009/0167877 | A1* | 7/2009 | Imamura | 348/208.4 |
| 2009/0322865 | A1* | 12/2009 | Wang et al. | 348/68 |
| 2010/0165122 | A1* | 7/2010 | Castorina et al. | 348/208.4 |

FOREIGN PATENT DOCUMENTS

| JP | 2005-051706 A | 2/2005 |
|---|---|---|
| JP | 2005-210350 A | 8/2005 |
| JP | 2006-164229 A | 6/2006 |
| JP | 2007-221681 A | 8/2007 |

* cited by examiner

*Primary Examiner* — Thai Tran
*Assistant Examiner* — Sunghyoung Park
(74) *Attorney, Agent, or Firm* — Drinker Biddle & Reath LLP

(57) ABSTRACT

Provided are a digital photographing apparatus that is capable of displaying a slide show in which music and images are displayed in a harmonious manner to the user by replaying a plurality of image files according to an atmosphere created by the music by determining a replay order of the plurality of image files according to the music based on music information and image information, a method of controlling the digital photographing apparatus, and a recording medium for recording the method.

16 Claims, 10 Drawing Sheets

DIGITAL PHOTOGRAPHING APPARATUS, METHOD OF CONTROLLING THE SAME, AND RECORDING MEDIUM FOR THE METHOD

CROSS-REFERENCE TO RELATED PATENT APPLICATION

This application claims the benefit of Korean Patent Application No. 10-2010-0012402, filed on Feb. 10, 2010, in the Korean Intellectual Property Office, the entire disclosure of which is incorporated herein by reference.

BACKGROUND

1. Field of the Invention

An aspect of the invention relates to a digital photographing apparatus capable of displaying image files according to music, a method of controlling the digital photographing apparatus, and a recording medium for the method.

2. Description of the Related Art

A digital photographing apparatus is capable of photographing a subject and displaying the photographed images. Also, the digital photographing apparatus is capable of storing music and playing the music. The digital photographing apparatus may display image files while playing music. However, the music that is played may detract from the viewing of the images because the music and images may not be in harmony with one another.

SUMMARY

Therefore, there is a need in the art for a method, computer readable medium, and digital photographing apparatus, the method including: selecting a music file; selecting a plurality of image files to be replayed according to the music file; analyzing music information of the music file; analyzing image information of the plurality of image files; determining a replay order of the plurality of image files according to music based on the music information and the image information; and replaying the plurality of image files according to the music.

Analyzing music information may include dividing the music into a plurality of frames; analyzing the plurality of frames; and determining a ranking of the plurality of frames according to a result of the analyzing.

A number of the plurality of frames may be the same as a number of the plurality of image files.

The analyzing of the image information may include extracting the image information from each of the image files; and ordering the plurality of image files according to the image information.

When the plurality of image files include a face image, the analyzing of the image information may include extracting a number of faces included in each of the image files and a degree of smiling; and ordering the plurality of image files according to the number of faces and the degree of smiling.

When the plurality of image files include a movement of a subject, the analyzing of the image information may include extracting a degree of movement of a subject included in each of the image files; and ordering the plurality of image files according to the degree of movement of the subject.

The analyzing of the image information may include extracting an average intensity or average saturation of the plurality of image files; and ordering the plurality of image files according to a greatness of the average intensity or the average saturation.

The analyzing of the image information may include extracting edge information of the plurality of image files; and ordering the plurality of image files according to the edge information.

The determining of a replay order of the plurality of image files may include reordering the plurality of image files according to the plurality of frames whose ranking is determined.

A non-transitory computer readable recording medium is disclosed. The non-transitory computer readable recording medium may having embodied thereon a method of controlling a digital photographing apparatus, the method including: analyzing music information of a music file; analyzing image information of a plurality of image files that are to be replayed according to the music file; determining a replay order of the plurality of image files according to music based on the music information and the image information; and replaying the plurality of image files according to the music.

The analyzing of the music information may include dividing the music into a plurality of frames, a number of which equals a number of the plurality of image files; and determining a ranking of the plurality of frames by analyzing the plurality of frames.

The analyzing of the image information may include extracting the image information from each of the image files; and ordering the plurality of image files according to the image information.

The determining of a replay order of the plurality of image files may include reordering the plurality of image files according to the plurality of frames whose ranking is determined.

A digital photographing apparatus is disclosed. The digital photographing apparatus may include a manipulation unit configured to generate a signal that selects a music file and a plurality of image files to be replayed according to the music file; a music information analyzing unit configured to analyze music information of the music file; an image information analyzing unit configured to analyze image information of the plurality of image files; a replay order determining unit configured to determine a replay order of the plurality of image files according to music based on the music information and the image information; and a replay unit configured to replay the plurality of image files according to the music.

The music information analyzing unit may include a frame dividing unit configured to divide the music into a plurality of frames; a frame analyzing unit configured to analyze the plurality of frames; and a frame ranking determining unit configured to determine a ranking of the plurality of frames according to a result of the analyzing performed by the frame analyzing unit.

The image information analyzing unit may include an image information extracting unit configured to extract image information from each of the image files; and an image file ordering unit configured to order the plurality of image files according to the image information.

The replay order determining unit may be configured to order the plurality of image files according to the plurality of frames whose ranking is determined.

The digital photographing apparatus may include a display unit configured to display the plurality of image files according to music that is replayed using the replay unit; and a speaker configured to output the music that is replayed by using the replay unit.

The digital photographing apparatus may include a music file storage unit configured to store the music file; and an image file storage unit configured to store the plurality of image files.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
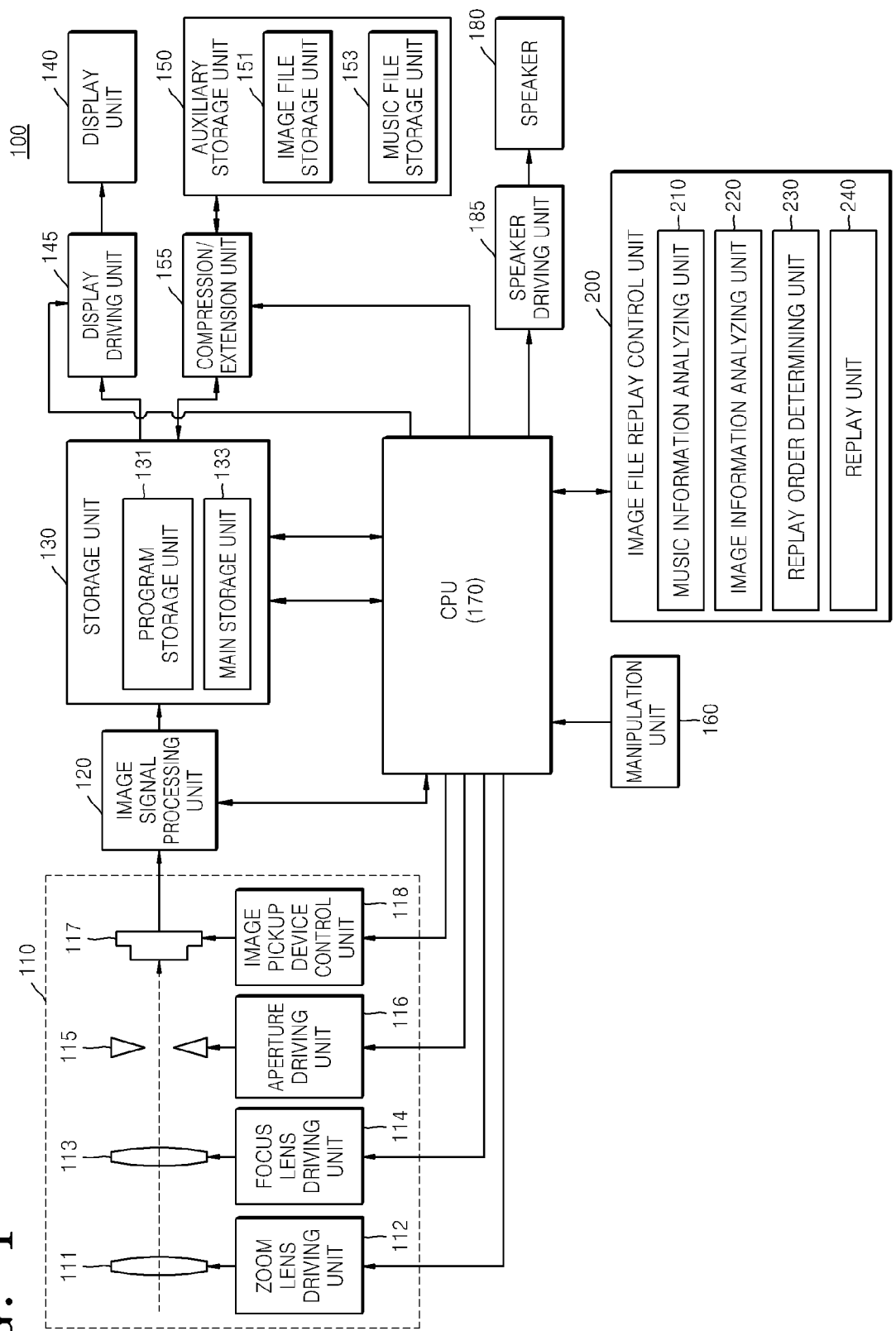
FIG. 1 illustrates a digital photographing apparatus according to an embodiment of the invention.

The invention will now be described more fully with reference to the accompanying drawings, in which exemplary embodiments of the invention are shown. Those components that are the same or are in correspondence are rendered the same reference numeral regardless of the figure number, and redundant explanations may be omitted.

FIG. 1 illustrates a digital photographing apparatus 100 according to an embodiment of the invention.

First, a subject is photographed in such a manner that image light from the subject passes through a zoom lens 111 and a focus lens 113, which are optical systems of an image pickup unit 110. The amount of image light is adjusted according to an opening degree of an aperture 115. The image light reaches a light receiving surface of an image pickup device 117, and thus an image of the subject is formed. The image formed on the light receiving surface of the image pickup device 117 is converted to an electric image signal by photoelectric conversion.

The image pickup device 117 may be a charge coupled device (CCD) sensor or a complementary metal oxide semiconductor (CMOS) image sensor that converts an optical signal into an electric signal. In general, the aperture 115 is in an open state when status methods or auto-focusing methods are executed, and exposure may be performed upon receiving a second release signal that is generated by softly pressing a release button.

Positions of the zoom lens 111 and the focus lens 113 are controlled by using a zoom lens driving unit 112 and a focus lens driving unit 113, respectively. For example, when a wide-angle zoom signal is generated, a focal length of the zoom lens 111 is reduced, thereby widening an angle of view. When a telephoto-zoom signal is generated, a focal length of the zoom lens 111 is enlarged, thereby reducing an angle of view. A position of the focus lens 113 is adjusted while the position of the zoom lens 111 is set, and thus the angle of view is barely influenced by the position of the focus lens 113. An opening degree of the aperture 115 is controlled by, for example, an aperture driving unit 114. Also, sensitivity of the image pickup device 117 is adjusted by, for example, an image pickup device control unit 118.

The zoom lens driving unit 112, the focus lens driving unit 114, the aperture driving unit 116, and the image pickup device control unit 118 control corresponding elements according to calculation results obtained from a CPU 170 based on exposure information, focus information, etc.

An image signal is generated as follows. An image signal output from the image pickup device 117 is output through an image signal processing unit 120. When the image signal input from the image pickup device 117 is an analog signal, the image signal processing unit 120 converts the analog signal into a digital signal, and various image processing is conducted on the converted digital signal. The image signal is temporarily stored in a storage unit 130.

In detail, the image signal processing unit 120 may improve image quality by performing signal processing such as auto white balance, auto-exposure, gamma correction, or the like so as to convert an image for forming an image that appeals to the user, and output the image signal with the improved image quality. Also, the image signal processing unit 120 performs image processing such as color filter array interpolation, color matrix processing, color correction, color enhancement, etc.

The storage unit 130 may include a program storage unit 131 in which programs related to operations of the digital photographing apparatus 100 are stored regardless of whether power is supplied or not and a main storage unit 133 that temporarily stores the image signal or other signals while power is being supplied.

An operation program for operating the digital photographing apparatus 100 and various application programs are stored in the program storage unit 131. The CPU 170 controls each of the elements according to the programs stored in the program storage unit 131.

The main storage unit 133 temporarily stores an image signal output from the image signal processing unit 120 or an auxiliary storage unit 150. Also, the main storage unit 133 receives data on the operation program or the application programs from the program storage unit 131 and temporarily stores the same, and then converts the data into executable codes and stores the same. Also, the CPU 170 controls corresponding elements according to the programs stored in the main storage unit 133.

The image signal stored in the main storage unit 133 is output to a display driving unit 145 and converted to an analog signal, and at the same time converted to an image signal in an optimum form to be output to a display unit 140. Also, the converted image signal may be displayed on the display unit 140 to be shown to the user as a predetermined image. According to the current embodiment of the invention, the display unit 140 may display a plurality of image files according to music that is replayed by using a replay unit 240 in the above-described process. The display unit 140 may be a liquid crystal display (LCD), an organic light emitting display (OLED), an electrophoretic display, or the like.

The image signal that is temporarily stored in the main storage unit 133 is output to a compression/extension unit 155. The compression/extension unit 155 performs compression on the image signal using a compression circuit, and the image signal is compressed into an optimum form so as to be stored, e.g., encoded into a joint photographic coding experts group (JPEG) format, and to generate an image file in a predetermined format. The image file is stored in the auxiliary storage unit 150.

According to the current embodiment of the invention, the auxiliary storage unit 150 may include an image file storage unit 151 that stores an image file and a music file storage unit 153 that stores a music file. The music file may be input from the outside and stored, or a music file may be generated via a microphone included in the digital photographing apparatus 100 and then stored.

The auxiliary storage unit 150 may be a semiconductor memory such as a fixed-type semiconductor memory such as an external flash memory or a card type flash memory that is in the form of a card or a stick and is detachable from a device, or a magnetic memory device such as a hard disk or a floppy disk, etc.

An image is reproduced as follows. An image file that is compressed and written to the auxiliary storage unit 150 is output to the compression/extension unit 155, and extension processing, that is, encoding, is performed on the image file, thereby extracting an image signal from the image file. The image signal is output to the main storage unit 133. The image signal is temporarily stored in the main storage unit 133 and then may be reproduced as a predetermined image through the display unit 140 by using the display driving unit 145.

Meanwhile, the digital photographing apparatus 100 includes a manipulation unit 160 that receives an external signal of the user. The manipulation unit 160 may be various functional buttons for selecting mode selection such as a photographing mode, a replay mode, etc. or a music file, a plurality of image files, etc. According to the current embodiment of the invention, when the user presses a button for selecting a music file or a plurality of image files, the manipulation unit 160 generates a corresponding signal. The manipulation unit 160 may be in the form of a button outside the digital photographing apparatus 100 or may be a touch screen of the display unit 140.

The digital photographing apparatus 100 includes a speaker 180 that extracts a music signal from the music file and outputs the music signal via a speaker driving unit 185. According to the current embodiment of the invention, the speaker 180 outputs music that is replayed by using the replay unit 240. The speaker 180 may control a type of sound or an amplitude of the sound by using the speaker driving unit 185.

The CPU 170 performs calculation according to the operation system and the application programs stored in the program storage unit 131, temporarily stores results of the calculation, and controls corresponding elements according to the calculation results to thereby operate the digital photographing apparatus 100 as described above.

The digital photographing apparatus 100 may further include an image file replay control unit 200. The image file replay control unit 200 includes a music information analyzing unit 210, an image information analyzing unit 220, a replay order determining unit 230, and a replay unit 240.

The music information analyzing unit 210 receives a signal for selecting a music file that is generated using the manipulation unit 160 and extracts a selected music file from the music file storage unit 153. Next, the music file is decoded to replay music from the music file, and music information of the music file is analyzed from the music.

Figure 2:
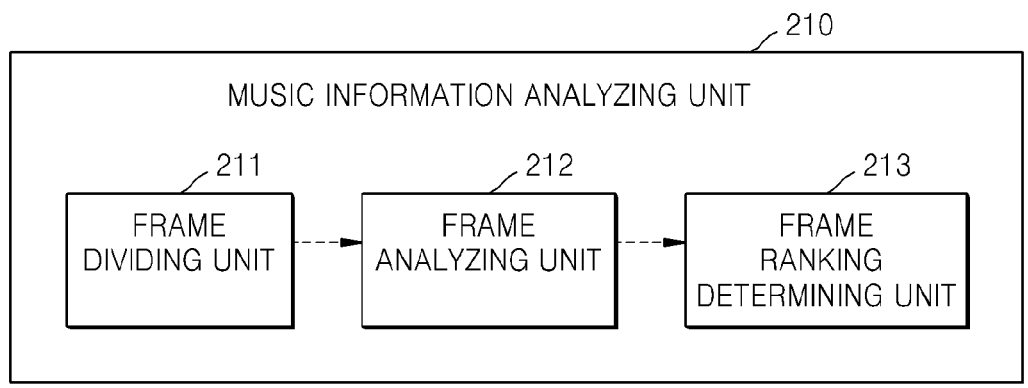
FIG. 2 illustrates a music information analyzing unit according to an embodiment of the invention.

FIG. 2 illustrates the music information analyzing unit 210 according to an embodiment of the invention. The music information analyzing unit 210 may include a frame dividing unit 211, a frame analyzing unit 212, and a frame ranking determining unit 213.

The frame dividing unit 211 divides the music into a plurality of frames. The number of frames the music is divided into may be the same as the number of image files that are to be replayed according to music.

The frame analyzing unit 212 analyzes each of the divided frames. According to the current embodiment of the invention, how much energy is shown according to frequencies of the frames may be determined. The energy here refers to sound intensity such as decibels (dB) but is not limited thereto. According to another embodiment of the invention, the sound intensity according to frequencies of each of the frames may be displayed using spectrums using fast Fourier transformation (FFT).

The frame ranking determining unit 213 determines a ranking of the frames based on the results obtained from the frame analyzing unit 212. For example, an average of energy values under a predetermined frequency is calculated among energy values according to frequencies obtained from the frame analyzing unit 212. Next, average energy values are compared to determine ranking of the frames. The ranking of the frames may be determined in an ascending order from a frame having a small average energy. However, a method of determining the ranking of the frames is not limited; the ranking of the frames may be determined by using an average energy value of the total frequencies of the frames or by comparing greatest energy values of the frames.

The image information analyzing unit 220 receives a signal for selecting a plurality of image files, which is generated using the manipulation unit 160, and extracts the selected plurality of image files from the image file storage unit 153. Next, the image files are decoded to obtain an image, and image information of the image file is analyzed based on the image.

Figure 3:
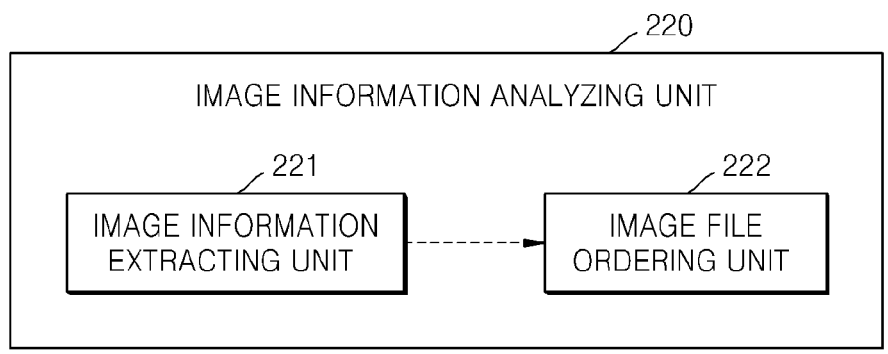
FIG. 3 illustrates an image information analyzing unit according to an embodiment of the invention.

FIG. 3 illustrates the image information analyzing unit 220. The image information analyzing unit 220 may include an image information extracting unit 221 and an image file ordering unit 222.

The image information extracting unit 221 extracts image information from each of the image files. For example, when a face image is included in a plurality of image files (that is, the image files are images showing people), the image information may comprise a number of faces included in each image and a degree of smiling. Alternatively, when the image of movement of a subject is included in the plurality of image files, the image information may comprise degree of movement of a subject included in each image. Alternatively, the image information may be average color intensity or average color saturation of an image. Alternatively, the image information may be edge information of an image. The image information according to the current embodiment of the invention is not limited thereto and may vary.

The image file ordering unit 222 orders the image files according to the image information extracted from the image information extracting unit 221. For example, an image including more faces and a greater degree of smiling may be ordered in a descending order or an ascending order. Also, an image file having a greater movement degree may be ordered in a descending order or an ascending order. Alternatively, image files may be ordered according to average color intensity or average color saturation of images and edge information of the images.

The replay order determining unit 230 orders image files according to the frames based on the music information and the image information. That is, a replay order of image files is determined according to the music. Image files are ordered according to the ranking of the frames so as to provide a harmonious feeling to the user when listening to the music and viewing the images. For example, a soft looking image may be matched to soft and quiet music, and an image with a strong feeling that evokes a strong emotional response may be matched to loud and fast music.

The replay unit 240 replays the plurality of image files ordered by using the replay order determining unit 230 according to music. The replay unit 240 replays music such that when each frame is replayed according to a time order, each image file corresponding to each frame is output on the display unit 140 by using the display driving unit 145. Also, the replay unit 240 outputs the music to the speaker 180 by using the speaker driving unit 185.

Figure 4:
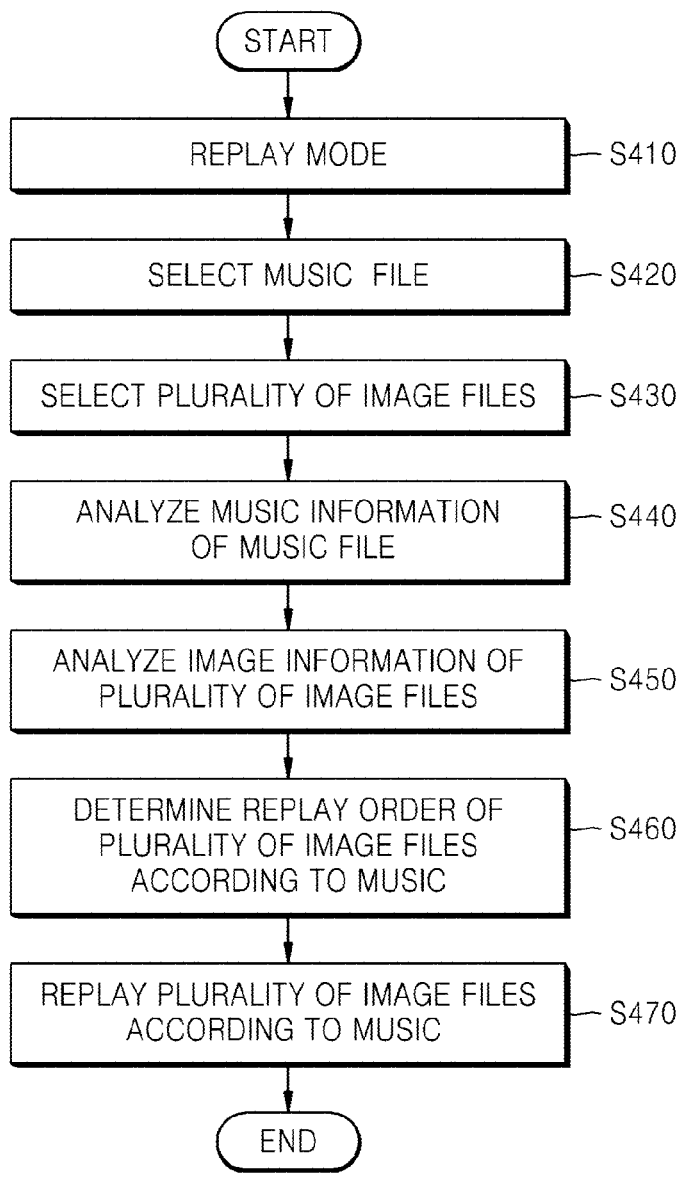
FIG. 4 is a flowchart illustrating a method of controlling a digital photographing apparatus, according to an embodiment of the invention.

FIG. 4 is a flowchart illustrating a method of controlling the digital photographing apparatus 100, according an embodiment of the invention.

A method of replaying a plurality of image files according to music, which is included in the method of controlling the digital photographing apparatus 100, will now be described in detail with reference to FIG. 4.

First, a replay mode is entered in operation S410. For example, a replay mode may be an image file play mode or a slide show play mode.

Figure 5:
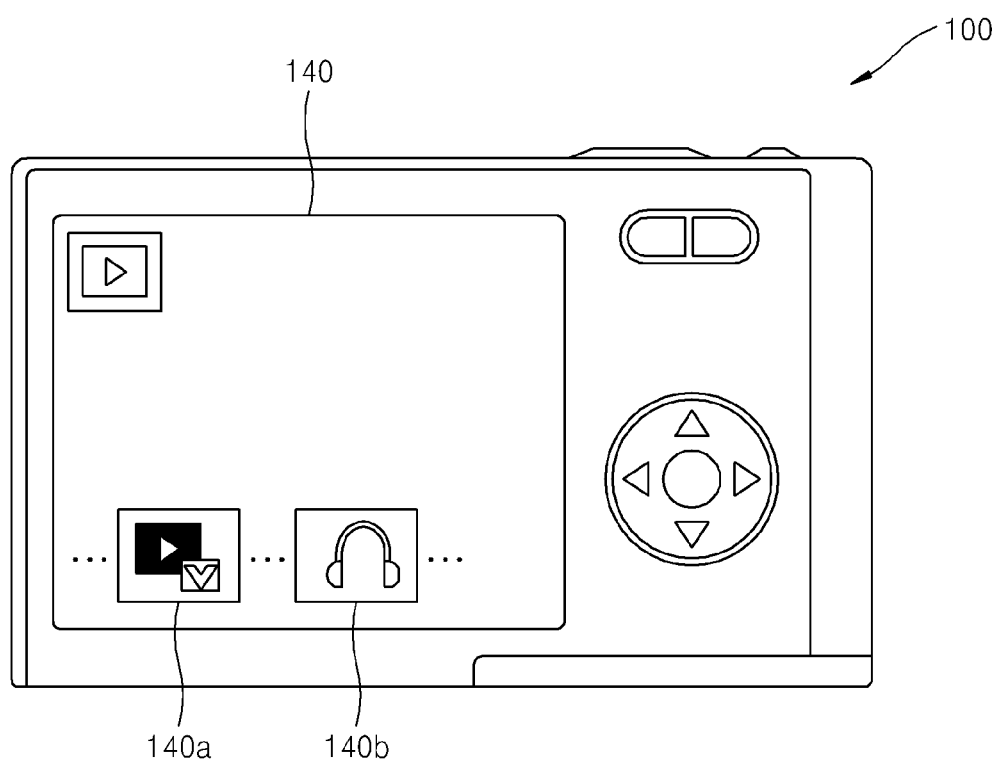
FIG. 5 illustrates a screen of a digital photographing apparatus corresponding to operations of the method illustrated in FIG. 4, according to an embodiment of the invention.

Next, in operation S420, the user selects a music file to be used as background music by using the manipulation unit 160. FIG. 5 illustrates a screen corresponding to operations S410, S420, and S430. Referring to FIG. 5, a manipulation signal may be generated from an operation of selecting a music selection icon 140*b* and applied to a corresponding element of the digital photographing apparatus 100.

In operation S430, a plurality of image files to be replayed according to music are selected by the user via the manipulation unit 160. Referring to FIG. 5, a manipulation signal is generated from an operation of selecting an image file selection icon 140*a* and is applied to a corresponding element of the digital photographing apparatus 100.

According to the current embodiment, operations S420 and S430 may be performed not necessarily in a predetermined order. For example, a music file and a plurality of image files may be selected at the same time, or a plurality of image files may be first selected, and then a music file may be selected.

Figure 6:
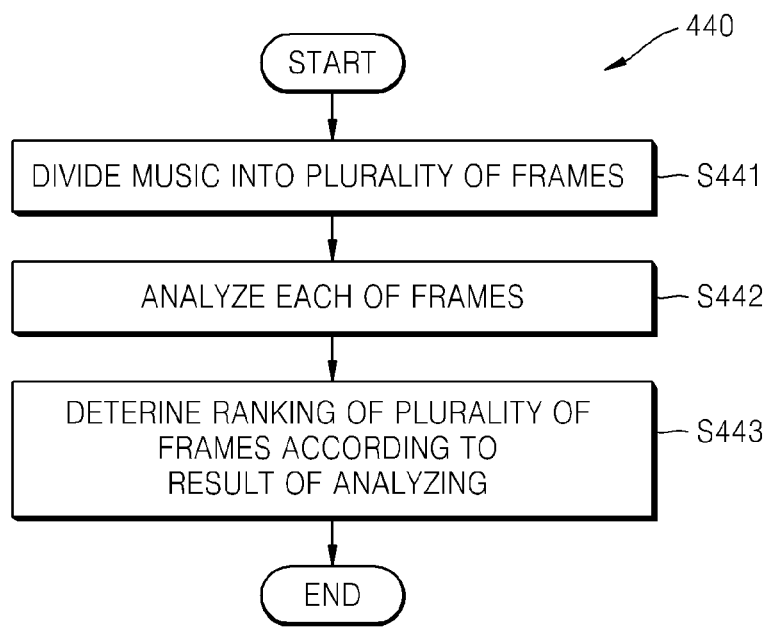
FIG. 6 is a flowchart illustrating a process of analyzing music information, according to an embodiment of the invention.

Next, music information of the selected music file is analyzed in operation S440. FIG. 6 is a flowchart illustrating a process of analyzing music information, according to an embodiment of the invention, and FIG. 7 is a diagram for explaining the process of analyzing music information illustrated in FIG. 6.

Figure 7:
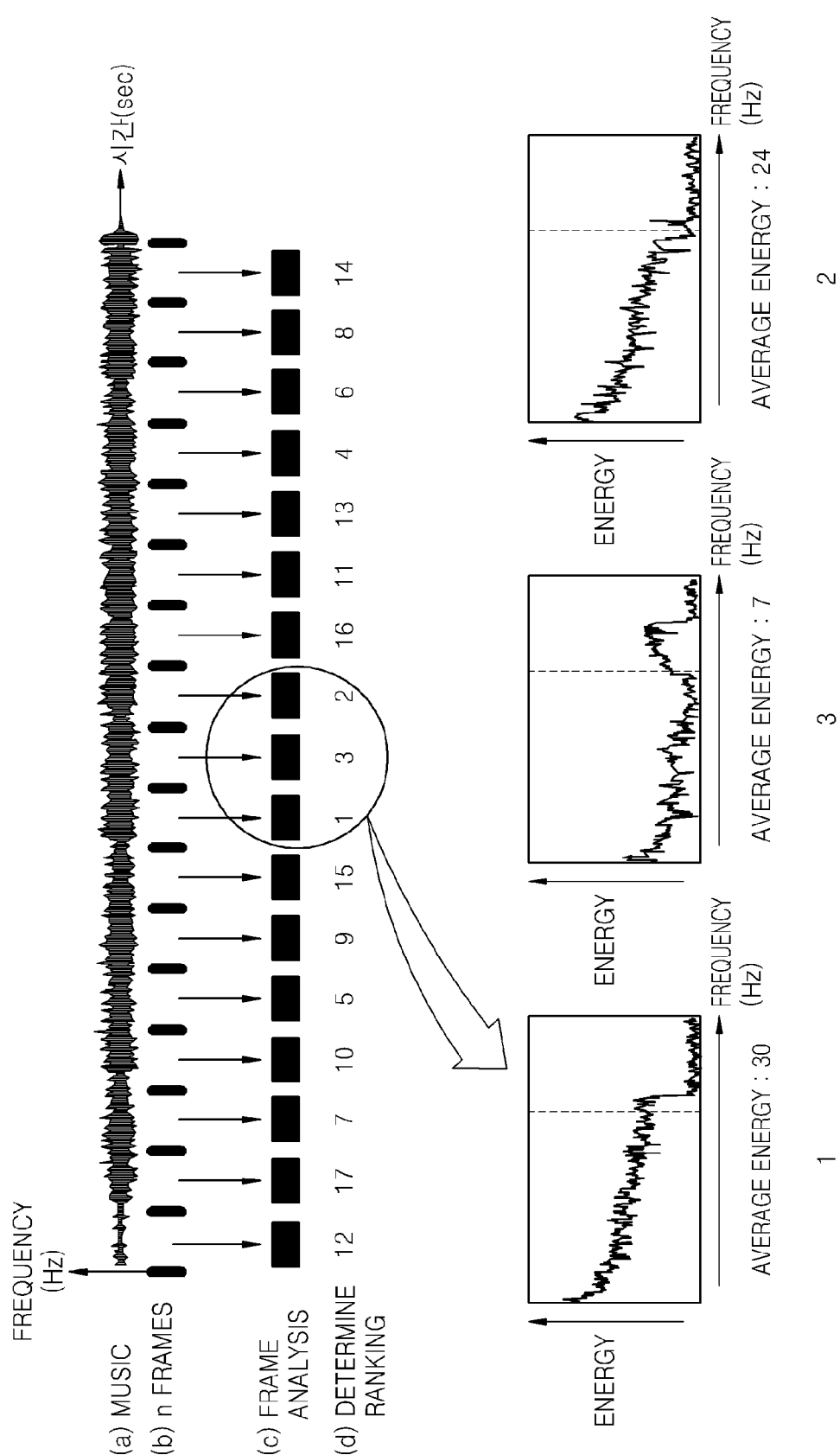
FIG. 7 is a diagram for explaining the process of analyzing music information.

Referring to FIGS. 6 and 7, first, music is divided into a plurality of frames in operation S441. The music may be represented by frequency (Hz) with respect to time (sec) as shown in portion (a) of FIG. 7. The music represented as described above may be divided into a number of frames equaling the number of image files, n image files, which are to be replayed according to the music, as shown in portion (b) of FIG. 7.

Next, the frames are analyzed in operation S442. Referring to portion (c) of FIG. 7, first, each frame is represented by frequency (Hz) vs. energy. Energy denotes sound intensity, and may be, for example, decibels (dB). An average energy of each of the frames under a predetermined frequency is calculated. However, analysis of the frames is not limited thereto, and for example, an average energy of the entire frequency of each of the frames or a greatest energy of each of the frames may also be calculated.

Next, ranking of the frames is determined based on results of the analysis in operation S443. Referring to portion (d) of FIG. 7, for example, the ranking of the frames may be determined in a descending order from a frame having a large average energy under a predetermined frequency of each of the frames. However, the determining the ranking of the frames is not limited thereto; for example, the ranking of the frames may also be determined in an ascending order from a frame having small average energy. The ranking of the frames may be determined and a number flag or a tag may be attached to each of the frames according to the ranking. However, the arrangement of the frames is not changed in operation S443.

Figure 8:
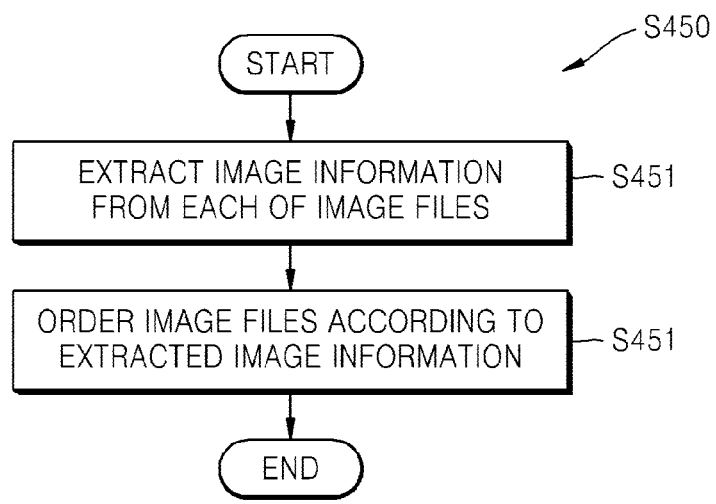
FIG. 8 is a flowchart illustrating a process of analyzing image information, according to an embodiment of the invention.
Figure 10:
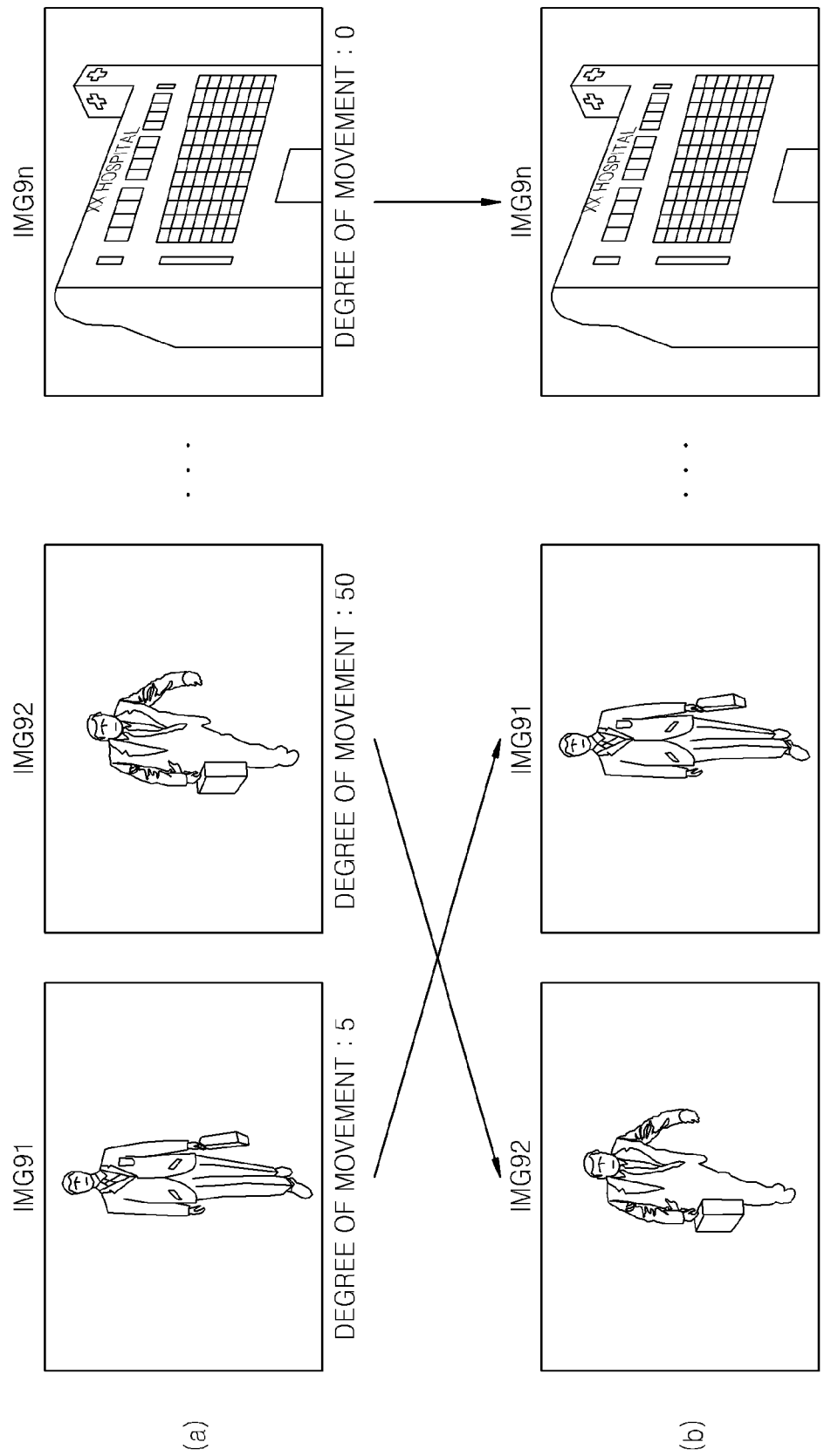
FIG. 10 is a schematic view of a case where image information includes a degree of movement of a subject included in an image.
Figure 11:
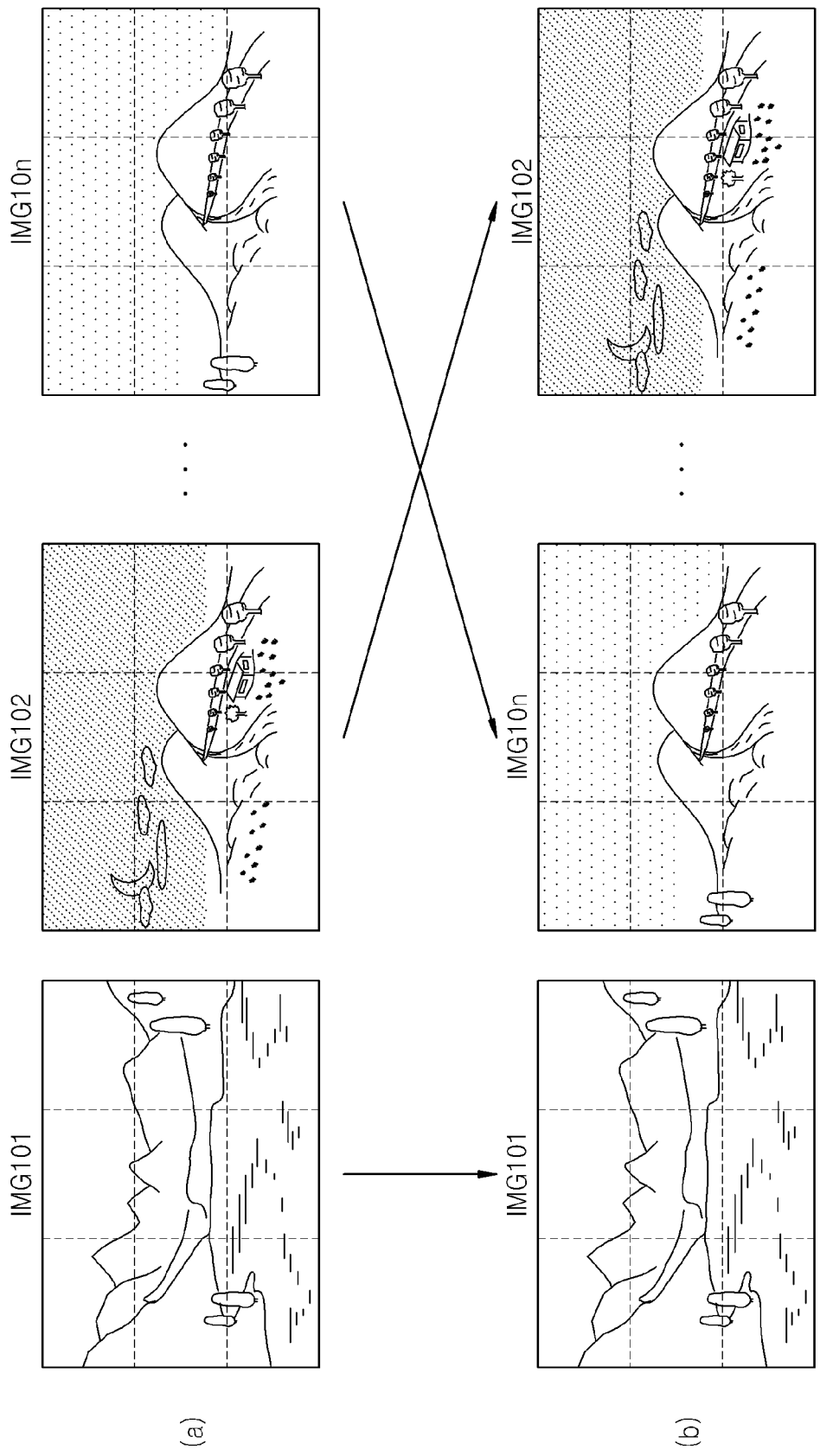
FIG. 11 is a schematic view of a case where the image information includes average intensity or average saturation of an image.

Referring to FIG. 4 again, image information of the plurality of image files is analyzed in operation S450. FIG. 8 is a flowchart illustrating a process of analyzing image information, according to an embodiment of the invention, and FIGS. 9 through 11 are diagrams for explaining the process of analyzing image information of FIG. 8.

Referring to FIG. 8, first, image information is extracted from each of a plurality of image files in operation S451. Next, the plurality of image files are ordered according to the extracted image information in operation S452. An example thereof will be described in detail with reference to FIGS. 9 through 11.

Figure 9:
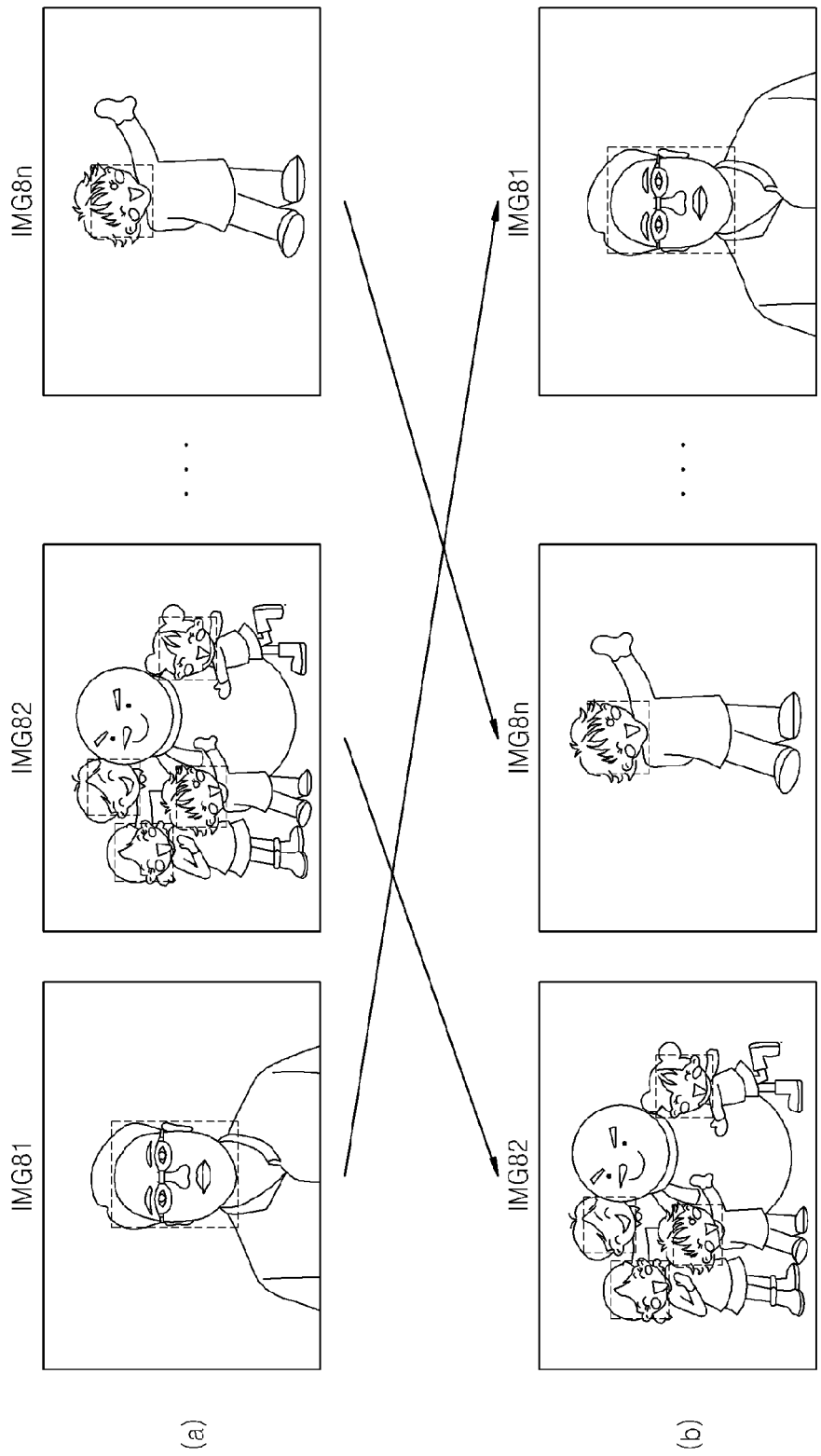
FIG. 9 is a schematic view of a case where image information includes a number of faces included in an image and a degree of smiling of the faces.

Referring to FIG. 9, the image information includes a number of faces included in the image and a degree of smiling.

The number of faces included in the image is extracted by using face recognition algorithms. For example, the number of faces may be extracted by using unchangeable features of faces such as geometrical characteristics or skin-tone of faces by using a feature-based face detection method. Alternatively, a few standard face patterns may be created using a face template-based detection method and stored for face detection, and then the patterns are compared one by one with an image in a search window of the image to detect a number of faces. Alternatively, a number of faces may be detected from an input image by using a face detection method based on a support vector machine (SVM) in which various areas from an image are subsampled and learned with respect to faces and areas not including faces by using a learning apparatus. Face recognition algorithms are not limited to the above and may vary.

The degree of smiling of the faces included in the image is extracted by using smile recognition algorithms. Smile information may be represented as 0% through 100%, and the higher the percentage, the more smiles included in the image. In the smile recognition algorithms, a face area is extracted by using face recognition algorithms, and then the degree of smiling is extracted by using geometrical factors such as positions, sizes, and forms of characteristic points of a face such as eyes or mouth, and distances between the characteristic points of the face. However, the smile recognition algorithms are not limited to the above and may vary.

Referring to FIG. 9, as shown in portion (a), a number of faces included in a plurality of images IMG81, IMG82, . . . , and IMG8n and the degree of smiling of the faces are analyzed, and the images may be reordered in a descending order from an image file with greater smiling degree as shown in portion (b). However, a method of reordering the plurality of image files is not limited thereto, and the images may also be reordered in an ascending order regarding the degree of smiling.

FIG. 10 illustrates a case where the image information includes a degree of movement of a subject included in an image.

The degree of movement of a subject included in an image is extracted by using movement recognition algorithms. For example, the degree of movement may be represented by a value from 0 to 127. Various movement recognition methods may be used. For example, a variation in brightness signal may be calculated during an exposure time when capturing an image, or movement information of the subject may be obtained by calculating a movement vector of characteristic points. The digital photographing apparatus 100 may store the obtained movement information in a JPEG file and extract the same when necessary to express the degree of movement of the subject stepwise.

Referring to FIG. 10, as shown in portion (a), the degree of movement of subjects included in a plurality of images IMG91, IMG92, . . . , and IMG9n may be analyzed and the images may be reordered in a descending order from an image having a great degree of movement of the subject as shown in portion (b). However, a method of reordering the plurality of image files is not limited thereto, and the images may also be reordered in an ascending order from an image having a small degree of movement of the subject.

FIG. 11 illustrates a case where the image information includes average color intensity or average color saturation of an image.

Average color saturation (S) or color intensity (I) of each image may be an average of levels obtained by analyzing histograms of saturation channels or intensity channels of each of the images. However, the average saturation or the average intensity of the image may also be obtained using various other methods. The greater the average saturation, the closer the image is to primary colors, and the smaller the average saturation, the closer the image is to achromatic colors. Also, the greater the average intensity, the closer the image is to white, and the smaller the average intensity, the closer the image is to black.

Referring to FIG. 11, as shown in portion (a), average saturation or average intensity of a plurality of images ING101, IMG102, . . . , and IMG10n may be extracted and the images may be reordered in a descending order from an image with a greater average value. Referring to FIG. 11, an image IMG101 has the greatest average saturation or average intensity, and an image IMG102 has the smallest average saturation or average intensity. Accordingly, the plurality of image files may be reordered as shown in portion (b) of FIG. 11.

Alternatively, the image information may be edge information of images. That is, edge information of each of the images may be extracted to reorder image files based on the edge information. To define edge information, edges of an image are detected and an edge map is written, and pixels of the image are binary-coded into a group of brightness of a standard value or greater and a group of brightness under the standard value. Then a number of pixels having brightness of a predetermined standard value or greater is defined as edge information. However, defining edge information is not limited thereto.

According to the current embodiment of the invention, operations S440 and S450 may be performed regardless of time order. For example, music information analysis and image information analysis may be performed at the same time, or the image information analysis may be performed first and then the music information analysis may be performed.

Referring to FIG. 4 again, a replay order of a plurality of image files is determined according to the music in operation S460. That is, as illustrated in FIG. 7, the ordered image files are matched one by one according to the determined ranking of the frames. For example, when the ranking of the frames is determined from a frame having a great average energy based on the music information analysis, an image file having a large number of faces and a high degree of smiling may be matched to a frame having a high average energy value. In this case, music having large average energy with a lively atmosphere is matched to the image including many persons and with a lot of smiling. Alternatively, an image file having great degree of movement may be matched to a frame having a great average energy. In this case, music with great average energy is matched to the image with much movement. Also, alternatively, an image file having high average intensity or high average saturation may be matched to a frame having a high average energy value. In this case, music according to the atmosphere of the image is matched to a bright image with a strong feeling that evokes a strong emotional response.

Finally, in operation S470, the digital photographing apparatus 100 replays music and displays a plurality of image files according to the music at the same time. According to the current embodiment, music information and image information are analyzed and the plurality of image files are matched to a predetermined portion of the music to provide a slide show. Thus, the user may now also view an improved slide show.

According to the embodiments of the invention, a plurality of image files are reproduced according to music, and the user may see a slide show in which music and images are harmoniously combined.

The invention may be applied to digital photographing devices, e.g., digital cameras, mobile phones including cameras, digital camcorders, etc.

The invention can also be embodied as computer readable codes on a computer readable recording medium. The computer readable recording medium is any data storage device that can store data which can be thereafter read by a computer system. The computer readable recording medium may be limited to non-transitory computer readable recording medium.

Examples of the computer readable recording medium include read-only memory (ROM), random-access memory (RAM), CD-ROMs, magnetic tapes, floppy disks, optical data storage devices, etc. (such as data transmission through the Internet). The computer readable recording medium can also be distributed over network coupled computer systems so that the computer readable code is stored and executed in a distributed fashion. Also, functional programs, codes, and code segments for accomplishing the invention can be easily construed by programmers skilled in the art to which the invention pertains.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the current specification are merely used to describe particular embodiments, and are not intended to limit the invention. An expression used in the singular encompasses the expression of the plural, unless it has a clearly different meaning in the context. In the current specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated to be incorporated by reference and were set forth in its entirety herein.

What is claimed is:

1. A method of controlling a digital photographing apparatus, the method comprising:
    selecting a music file;
    selecting a plurality of image files to be replayed according to the music file;
    dividing the music into a plurality of frames; analyzing the plurality of frames; and
    determining a ranking of the plurality of frames according to a result of the analyzing;
    analyzing image information of the plurality of image files;
    determining a replay order of the plurality of image files based on the determined ranking of the plurality of frames and the image information; and
    replaying the plurality of image files according to the determined replay order together with the selected music file.

2. The method of claim 1, wherein a number of the plurality of frames is the same as a number of the plurality of image files.

3. The method of claim 1, wherein the analyzing of the image information comprises:
    extracting the image information from each of the image files; and
    ordering the plurality of image files according to the image information.

4. The method of claim 3, wherein when the plurality of image files include a face image, the analyzing of the image information comprises:
    extracting a number of faces included in each of the image files and a degree of smiling; and
    ordering the plurality of image files according to the number of faces and the degree of smiling.

5. The method of claim 3, wherein when the plurality of image files include a movement of a subject, the analyzing of the image information comprises:
    extracting a degree of movement of a subject included in each of the image files; and
    ordering the plurality of image files according to the degree of movement of the subject.

6. The method of claim 3, wherein the analyzing of the image information comprises:
    extracting an average intensity or average saturation of the plurality of image files; and
    ordering the plurality of image files according to a greatness of the average intensity or the average saturation.

7. The method of claim 3, wherein the analyzing of the image information comprises:
    extracting edge information of the plurality of image files; and
    ordering the plurality of image files according to the edge information.

8. A non-transitory computer readable recording medium having embodied thereon a method of controlling a digital photographing apparatus, the method comprising:
    selecting a music file;
    selecting a plurality of image files that are to be replayed according to the music file;
    dividing the music into a plurality of frames, analyzing the plurality of frames; and determining a ranking of the plurality of frames according to a result of the analyzing;
    analyzing image information of the plurality of image files;
    determining a replay order of the plurality of image files based on the determined ranking of the plurality of frames and the image information; and
    replaying the plurality of image files according to the determined replay order together with the selected music file.

9. The non-transitory computer readable recording medium of claim 8, wherein the analyzing of the music information comprises:
    dividing the music into a plurality of frames, a number of which equals a number of the plurality of image files; and
    determining a ranking of the plurality of frames by analyzing the plurality of frames.

10. The non-transitory computer readable recording medium of claim 9, wherein the analyzing of the image information comprises:
    extracting the image information from each of the image files; and
    ordering the plurality of image files according to the image information.

11. The non-transitory computer readable recording medium of claim 9, wherein the determining of a replay order of the plurality of image files comprises reordering the plurality of image files according to the plurality of frames whose ranking is determined.

12. A digital photographing apparatus comprising:
- a manipulation unit configured to generate a signal that selects a music file and a plurality of image files to be replayed according to the music file;
- a music information analyzing unit configured to divide the music into a plurality of frames; to analyze the plurality of frames; and to determine a ranking of the plurality of frames according to a result of the analyzing performed by the frame analyzing unit;
- an image information analyzing unit configured to analyze image information of the plurality of image files;
- a replay order determining unit configured to determine a replay order of the plurality of image files based on the determined ranking of the plurality of frames and the image information; and
- a replay unit configured to replay the plurality of image files according to the determined replay order together with the selected music file.

13. The digital photographing apparatus of claim 12, wherein the image information analyzing unit comprises:
- an image information extracting unit configured to extract image information from each of the image files; and
- an image file ordering unit configured to order the plurality of image files according to the image information.

14. The digital photographing apparatus of claim 13, wherein the replay order determining unit is configured to order the plurality of image files according to the plurality of frames whose ranking is determined.

15. The digital photographing apparatus of claim 12, further comprising:
- a display unit configured to display the plurality of image files according to music that is replayed using the replay unit; and
- a speaker configured to output the music that is replayed by using the replay unit.

16. The digital photographing apparatus of claim 12, further comprising:
- a music file storage unit configured to store the music file; and
- an image file storage unit configured to store the plurality of image files.

* * * * *